(12) United States Patent
Ikeda

(10) Patent No.: US 8,072,559 B2
(45) Date of Patent: Dec. 6, 2011

(54) LIQUID CRYSTAL DISPLAY DEVICE AND MANUFACTURING METHOD THEREOF

(75) Inventor: Masaki Ikeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 181 days.

(21) Appl. No.: 12/668,853

(22) PCT Filed: Apr. 2, 2008

(86) PCT No.: PCT/JP2008/056574
§ 371 (c)(1),
(2), (4) Date: Jan. 12, 2010

(87) PCT Pub. No.: WO2009/013921
PCT Pub. Date: Jan. 29, 2009

(65) Prior Publication Data
US 2010/0201912 A1    Aug. 12, 2010

(30) Foreign Application Priority Data

Jul. 24, 2007 (JP) ................................. 2007-192047

(51) Int. Cl.
*G02F 1/1335* (2006.01)
(52) U.S. Cl. ................ 349/62; 349/56; 349/61; 349/64; 349/192
(58) Field of Classification Search .................... 349/56, 349/61, 62, 64, 192
See application file for complete search history.

(56) References Cited

U.S. PATENT DOCUMENTS

| 5,280,374 A | 1/1994 | Nakai et al. |
| 5,756,649 A * | 5/1998 | Mizushima et al. .......... 528/353 |
| 2004/0179028 A1 | 9/2004 | Arai |
| 2009/0207353 A1* | 8/2009 | Nakajima et al. ............. 349/117 |
| 2010/0277684 A1* | 11/2010 | Fukushima et al. .......... 349/158 |

FOREIGN PATENT DOCUMENTS

| JP | 6-308442 A | 11/1994 |
| JP | 4-301617 A | 10/1996 |
| JP | 9-311350 A | 12/1997 |
| JP | 10-333186 A | 12/1998 |
| JP | 2004-279464 A | 10/2004 |

OTHER PUBLICATIONS

Chinese Office Action, The State Intellectual Property Office of the People's Republic of China, Mar. 2, 2011.

* cited by examiner

*Primary Examiner* — Jennifer Doan
(74) *Attorney, Agent, or Firm* — Birch, Stewart, Kolasch & Birch, LLP

(57) ABSTRACT

A liquid crystal display device 10 in accordance with the present invention includes a liquid crystal 11 and a lighting device 12, the liquid crystal panel 11 having a liquid crystal layer 50 provided between a pair of glass substrates 31, 41, the lighting device 12 supplying illumination light to the liquid crystal panel 11. The liquid crystal display device 10 is characterized in that a metal-halide containing region 60 is formed in a position in one of the pair of glass substrates 31, 41. The metal-halide containing region 60 contains a crystal of metal halide which exhibits photochromism in the light supplied from the lighting device 12. The position is capable of blocking light toward a luminance point defect occurrence portion X that becomes a cause of a luminance point defect. The one of the pair of glass substrates 31, 41 is disposed on the lighting device 12 side.

8 Claims, 6 Drawing Sheets

LIQUID CRYSTAL DISPLAY DEVICE AND MANUFACTURING METHOD THEREOF

TECHNICAL FIELD

The present invention relates to a liquid crystal display device and a manufacturing method thereof.

BACKGROUND ART

There is a method of manufacturing a liquid crystal device, which is such as follows: providing a switching element (for example, TFTs), pixel electrodes, etc. on one of a pair of glass substrates; providing a counter electrode etc. on the other one of the glass substrates and, thereafter, laminating the two glass substrates via a spacer; next, injecting liquid crystal into a space between the two glass substrates to form a liquid crystal layer and, thereafter, laminating polarizing plates onto surfaces of the two glass substrates to obtain a liquid crystal panel; finally, mounting a lighting device including, for example, a plurality of cold cathode tubes as a light source to the liquid crystal panel.

The above-explained process of manufacturing the liquid crystal device can include a step of detecting inferiority by operating various kinds of inspection at predetermined timings. For example, in the inspection after forming the liquid crystal layer, presence or absence of display inferiority is inspected by placing a pair of polarizing plates for inspection in a manner holding the two glass substrates therebetween, lighting a backlight for inspection, and driving the switching element.

In such an inspection step, if, for example, the liquid crystal layer has a foreign substance that has entered therein, the light strikes the foreign substance contained in the liquid crystal layer and is diffusely reflected so that the luminance point defect, which is luminant in spite that black is displayed, is detected. The luminance point defect extremely reduces the display quality and decreases the yield rate of manufacture.

To compensate such a luminance point defect, a method disclosed in, for example, Patent Document 1 is known. The method disclosed in Patent Document 1 is as follows: form a concavity process portion in a vicinity of a surface of a transparent substrate on the incident side located on an irradiation path of irradiation light that irradiates a pixel in which the luminance point defect has been occurred; and processing a side face and a bottom face of the concavity process portion into rough surfaces to form a light diffusing area.

[Patent Document 1] Japanese Unexamined Patent Application Publication No. 04-301617

Problem to be Solved by the Invention

However, because the invention stated in the Patent Document 1 forms the concavity process portion in the glass substrate, if the concavity process portion is deeply formed, the strength of the glass substrate is reduced. On the other hand, if the concavity process portion is formed so as to have a shallow dept so that reduction of strength of the glass substrate is avoided, a space of a certain distance has to exist between the concavity process portion and the defect portion. Where such a space exists, the incident light from the outside of the concavity process portion (i.e. from an unprocessed portion) causes diffraction when passing through the glass substrate and reaches the defect portion, which results in the luminance point defect uncompensated.

DISCLOSURE OF THE INVENTION

The present invention was achieved on a basis of the circumstances as above, and its object is to provide a liquid crystal display device having a higher display quality with a luminance point defect certainly invisible. Furthermore, an object of the present invention is to provide a method of manufacturing the liquid crystal display device, the method including a step capable of suitably compensating the luminance point defect that has been occurred in the liquid crystal display device.

Means for Solving the Problem

In order to solve the above-described problem, the liquid crystal display device in accordance with the present invention includes a liquid crystal and a lighting device, the liquid crystal panel having a liquid crystal layer provided between a pair of glass substrates, the lighting device supplying illumination light to the liquid crystal panel. The liquid crystal display device is characterized in that a metal-halide containing region is formed in a position in one of the pair of glass substrates. The metal-halide containing region contains a crystal of metal halide which exhibits photochromism in the light supplied from the lighting device. The position is capable of blocking light toward a luminance point defect occurrence portion that becomes a cause of a luminance point defect. The one of the pair of glass substrates is disposed on the lighting device side.

During repeated examination of a means for compensating the luminance point defect without reducing the strength of the glass substrate, i.e. without forming a concavity in the glass substrate, the inventor of the present invention has focused on photochromism that exhibits color change upon irradiation with light. Photochromism is a phenomenon that a molecule, upon exposure to light, transforms the bonding mode and changes into an isomer having a different structure without changing the molecular weight. Particularly, inorganic photochromism is easy to solidify and, by causing the base material to contain a minute quantity of the molecules, a photochromic base material having a higher reaction sensitivity can be obtained. One form of the photochromism is the phenomenon that the color of the molecules changes upon exposure to light. For example, upon irradiation with light, a glass substrate containing metal halide crystals having a size from 5 nm to 15 nm can be darkened (i.e. can exhibit black or gray). Note that, upon block of the irradiation light, the color gradually fades, and, after a while, the glass substrate reexhibits transmissibility.

Note here that a typical configuration of the liquid crystal display device is to supply the illumination light to the liquid crystal panel using the lighting device sufficiently provided therein. Then, when an image displayed in the liquid crystal display device is being viewed, the liquid crystal panel is always irradiated with light. That is, where the glass substrate is caused to contain the metal halide, the metal halide is also irradiated with the light of the lighting device.

Accordingly, the liquid crystal display device in accordance with the present invention has the configuration that the crystal of metal halide which exhibits photochromism is contained in the position in the glass substrate disposed on the lighting device side, the position being capable of blocking light toward the luminance point defect occurrence portion. Thus, in a state where the luminance point defect is usually visible to the viewer of the image, i.e. in the case where the illumination light is supplied to the liquid crystal panel, the crystal of the metal halide is also irradiated with the light, and thus, the region that contains the crystal of the metal halide is darkened. As a result of this, this darkened region blocks the incident light from the lighting device, and the light does not reach the luminance point defect occurrence portion. Thus, a better display quality with the invisible luminance point defect can be realized. Furthermore, the crystal of the metal halide is contained and is darkened, while there is no great change in the molecular structure of the glass substrate. Therefore, it does not lead to reduction of the strength of the glass substrate.

BEST MODE FOR CARRYING OUT THE INVENTION

An embodiment in accordance with the present invention will be described with reference to FIGS. 1 through 6.

Figure 1:
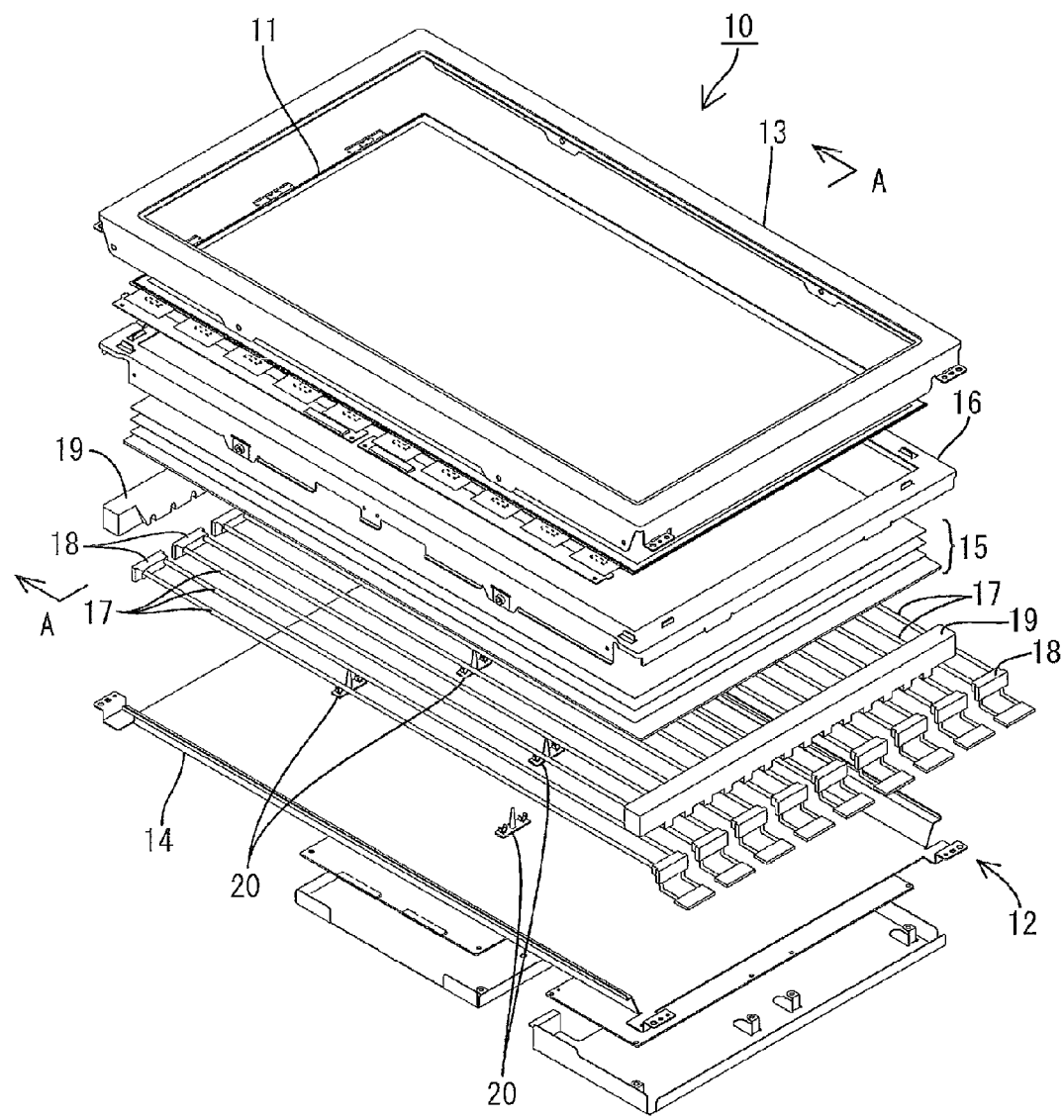
FIG. 1 is a perspective view illustrating a schematic configuration of a liquid crystal display device of an embodiment in accordance with the present invention.
Figure 2:
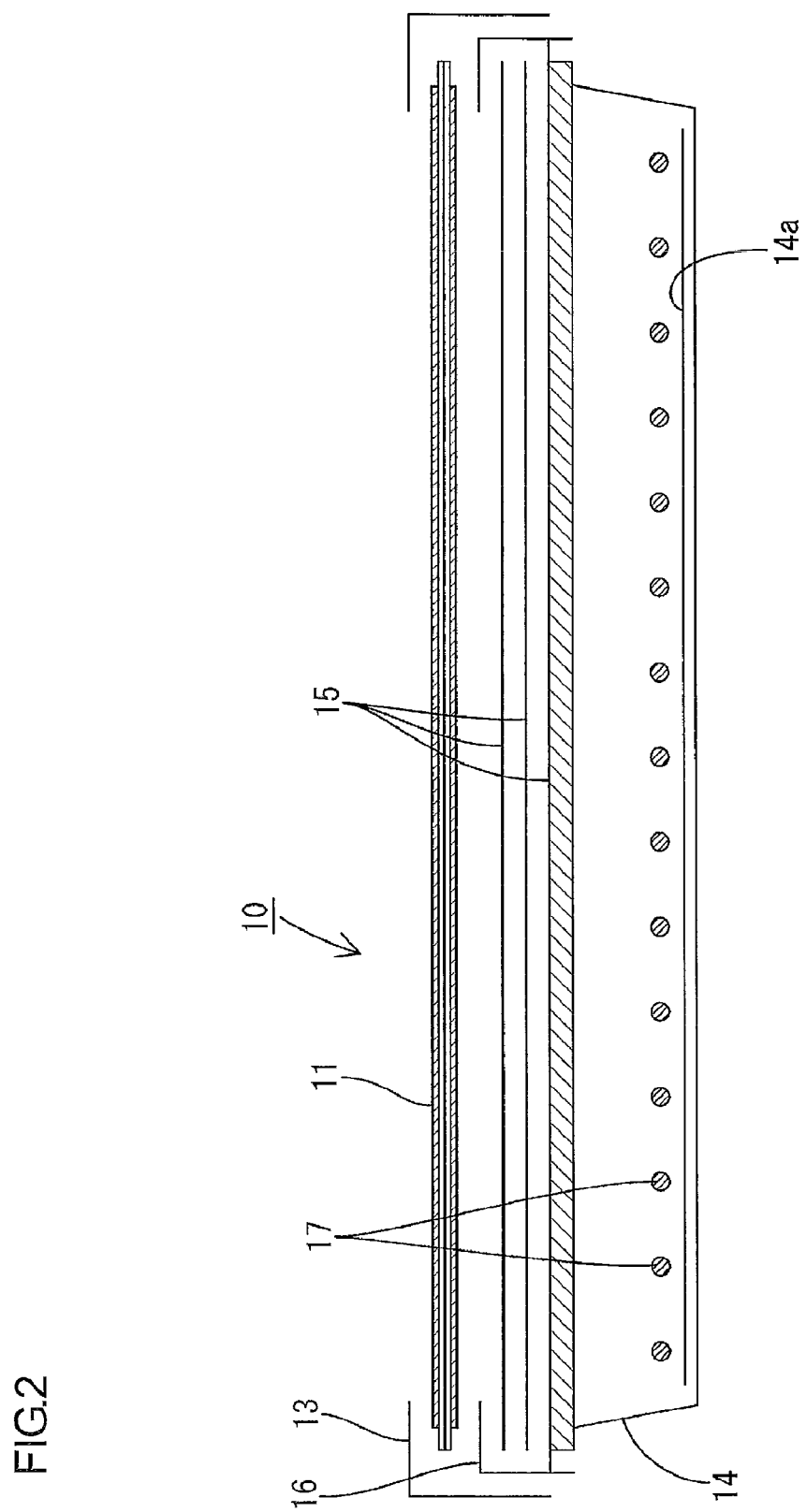
FIG. 2 is a sectional view of the liquid crystal display device of FIG. 1 taken on line A-A.
Figure 3:
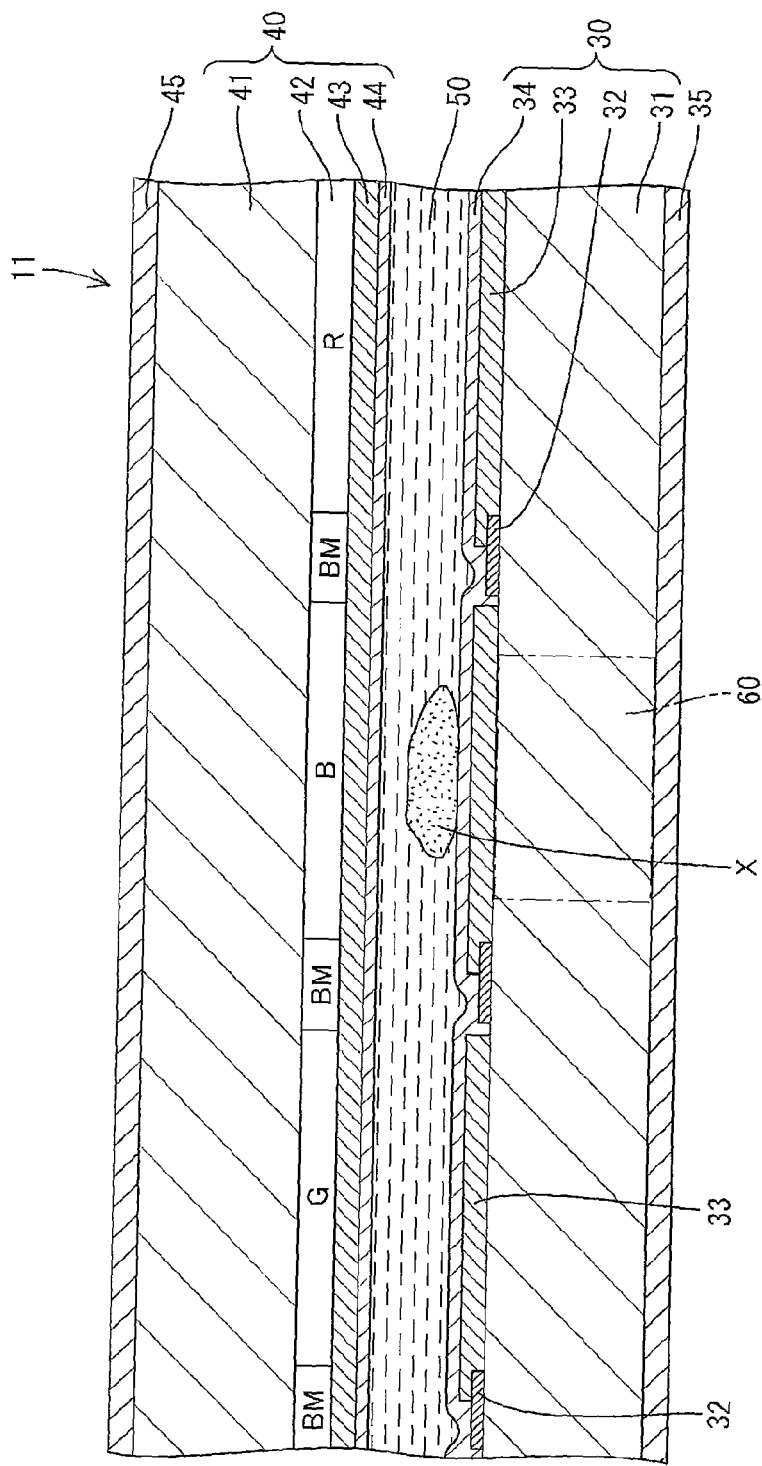
FIG. 3 is a sectional view of a main part of a liquid crystal panel that the liquid crystal display device of FIG. 1 includes.
Figure 4:
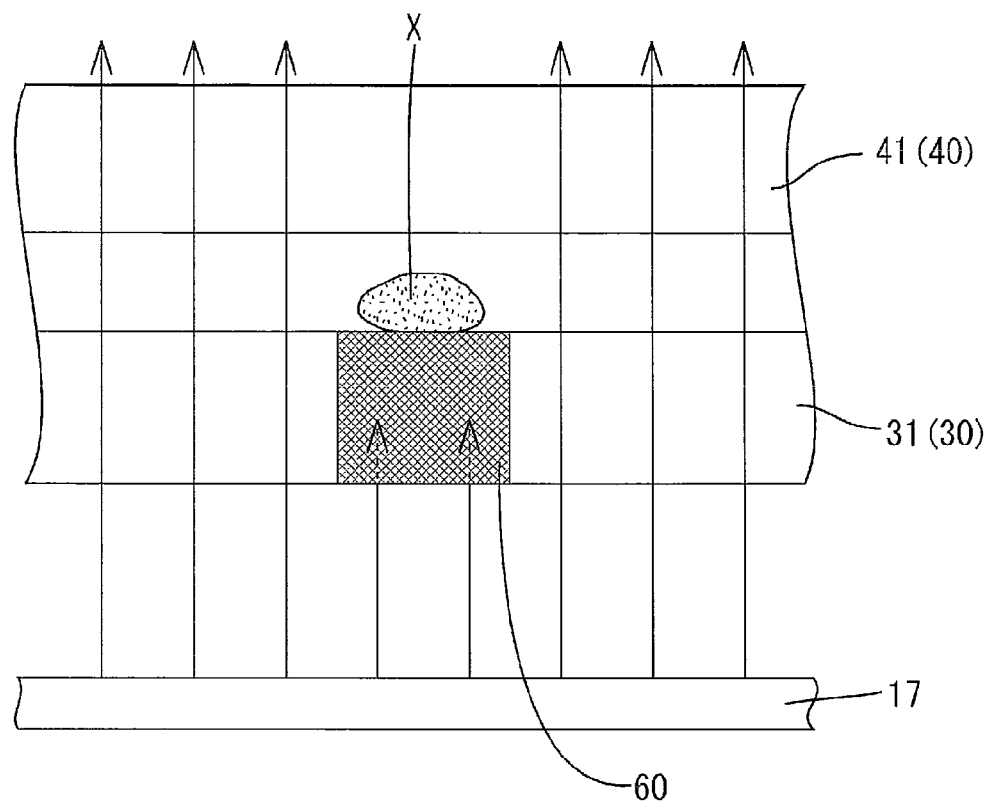
FIG. 4 is an explanatory view illustrating an operational effect of the liquid crystal display device of the embodiment.
Figure 5:
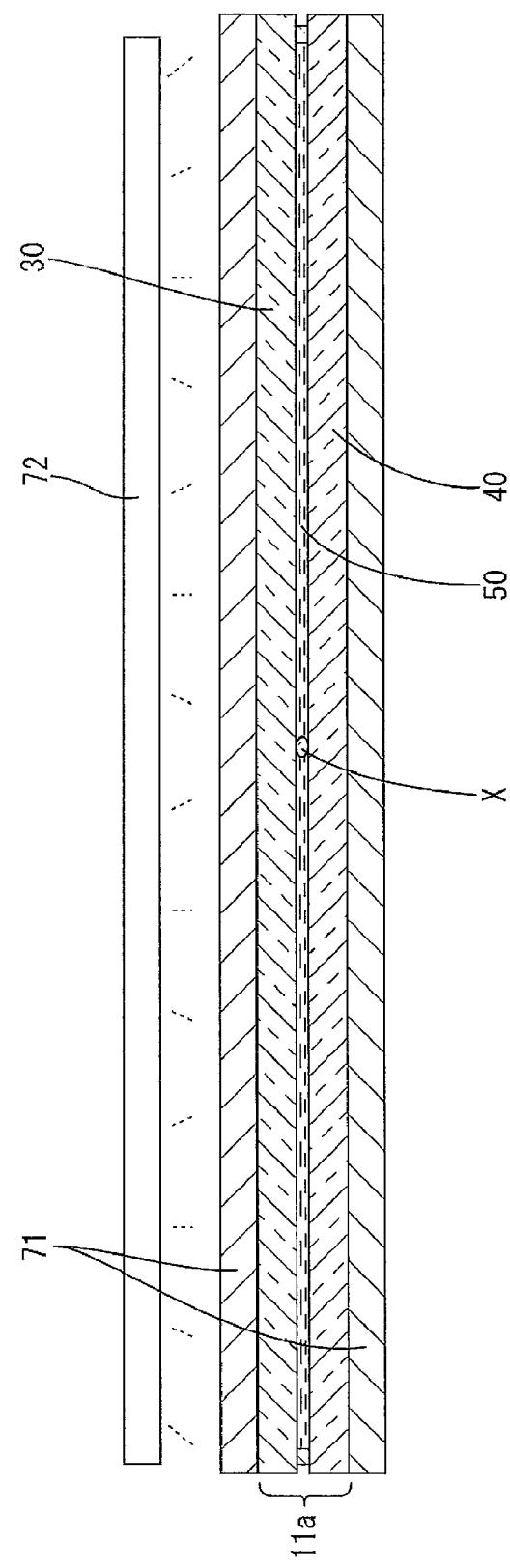
FIG. 5 is an explanatory view illustrating a lighting inspection step for an inspection-object liquid crystal panel.
Figure 6:
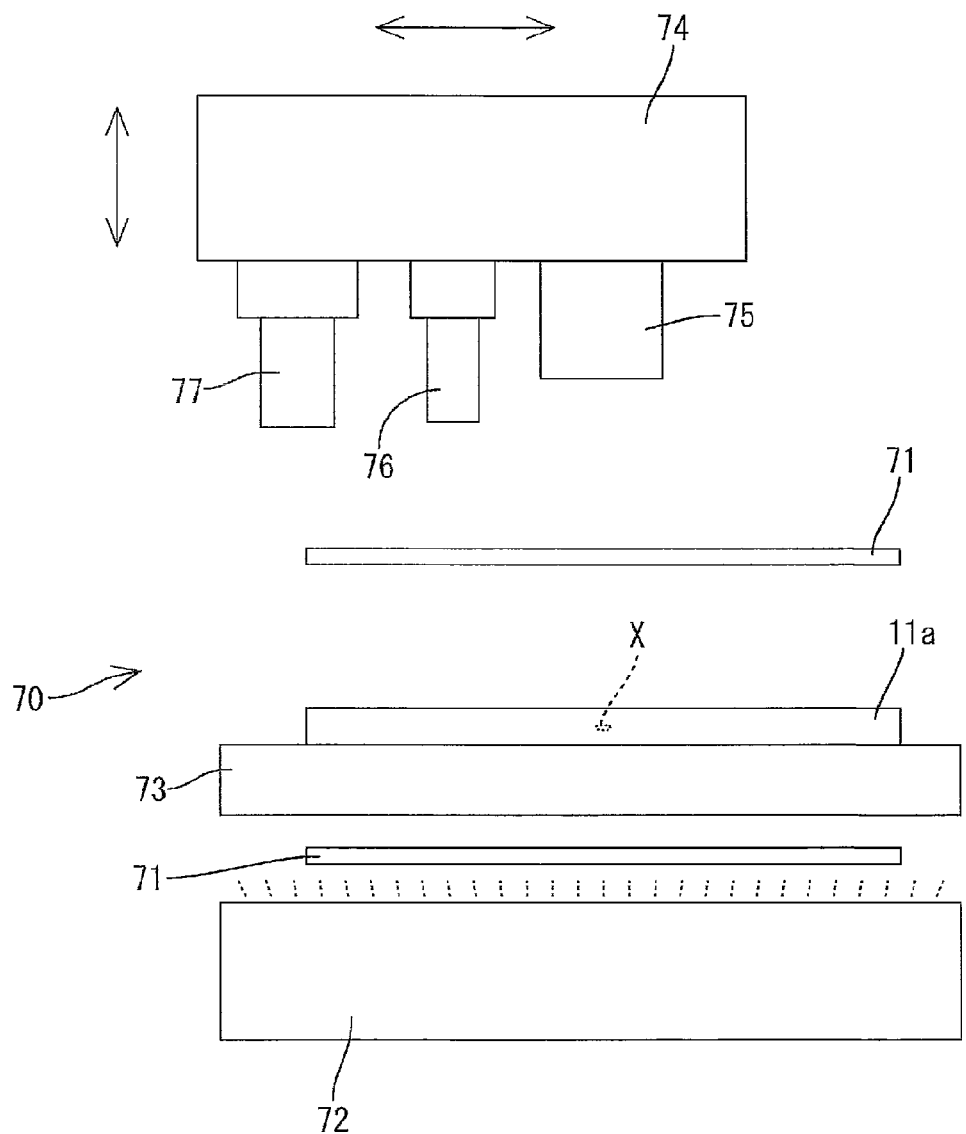
FIG. 6 is a side view illustrating a schematic configuration of a luminance point defect compensation device.

FIG. 1 is a perspective view illustrating a schematic configuration of a liquid crystal display device of this embodiment; FIG. 2 is a sectional view of the liquid crystal display device of FIG. 1 taken on line A-A; FIG. 3 is a sectional view of a main part of a liquid crystal panel that the liquid crystal display device of FIG. 1 includes; FIG. 4 is an explanatory view illustrating an operational effect that the liquid crystal display device of this embodiment produces; FIG. 5 is an explanatory view illustrating a state of a lighting inspection step for an inspection-object liquid crystal panel; and FIG. 6 is a side view illustrating a schematic configuration of a luminance point defect compensating device.

First, a general configuration of a liquid crystal display device 10 of this embodiment will be described. As illustrated in FIGS. 1 and 2, the liquid crystal display device 10 includes a liquid crystal panel 11 and a backlight device (a lighting device) 12, which are integrally held by a bezel 13 etc. The liquid crystal panel 11 has a rectangular shape. The backlight device 12 is an external light source. The backlight device 12 is a backlight device of a so-called direct type. The backlight device 12 is sufficiently provided with a plurality of light sources (cold cathode tubes 17 are herein used as high-pressure discharge tubes) directly below the backside of a panel face (a display face) of the liquid crystal panel 11 and along the panel face. The liquid crystal panel 11 will be described below.

The backlight device 12 includes a backlight chassis (chassis) 14, a plurality of optical members 15 (a diffuser plate, a diffuser sheet, a lens sheet, and a reflection polarizing plate, which are in this order from below in the figure), and a frame 16. The backlight chassis 14 has a substantial box shape with the top face side open. The optical members 15 are attached so as to cover the opening of the backlight chassis 14. The frame 16 holds these optical members 15 over the backlight chassis 14. Furthermore, the cold cathode tubes 17, holders 18 made of rubber, lamp holders 19, and lamp clips 20 are disposed in the backlight chassis 14. The holders 18 hold both ends of the cold cathode tubes 17. The lamp holders 19 collectively covers the cold cathode tubes 17 and the holders 18. The lamp clips 20 are for the cold cathode tubes 17 to be attached to the backlight chassis 14. Note that, in the backlight device 12, the optical members 15 side from the LEDs 18 is a light emission side.

Each cold cathode tube 17 has an elongated thin tubular shape. The plurality (16 tubes in FIG. 1) of cold cathode tubes 17 are accommodated in the backlight chassis 14 with the lengthwise direction (the axial direction) thereof parallel to the long side direction of the backlight chassis 14. On the other hand, the lamp clips 20, which are for the cold cathode tubes 17 to be attached to the backlight chassis 14, function as clip-shaped light source holders. The lamp clips 20 are made of synthetic resin (e.g. polycarbonate).

Furthermore, the backlight chassis 14 has a light reflecting surface formed by a light reflecting sheet 14a on the inner face side (the light source side) thereof. The backlight chassis 14 including the light reflecting sheet 14a can reflect light, which is emitted from the cold cathode tubes 17, to the optical members 15 (the diffuser plate etc.) side. The light reflecting sheet 14a can be configured by, for example, a light-reflective resin sheet.

Next, the liquid crystal panel 11 will be described. As illustrated in FIG. 3, the liquid crystal panel 11 has a configuration of a pair of substrates 30, 40 and liquid crystal. The pair of substrates 30, 40 are laminated together with a predetermined gap therebetween. The liquid crystal is sealed between the two substrates 30, 40 and forms a liquid crystal layer 50.

The substrate 30 is an element substrate. The substrate 30 includes a glass substrate 31, TFTs (thin-film transistors) 32 as semiconductor elements, pixel electrodes 33, and an alignment film 34. The TFTs 32 are formed on the liquid crystal layer 50 side of the glass substrate 31. The pixel electrodes 33 are electrically connected to the TFTs 32. The alignment film 34 is formed on the liquid crystal layer 50 side of the TFTs 32 and the pixel electrodes 33. Furthermore, a polarizing plate 35 is laid on a side of the glass substrate 31, the side being opposite from the liquid crystal layer 50 side. Note that, out of the pair of substrates 30, 40, the substrate 30 (the glass substrate 31) is disposed on the backlight device 12 side.

On the other hand, the substrate 40 is an opposite substrate. The substrate 40 includes a glass substrate 41, a color filter 42, a counter electrode 43, and an alignment film 44. The color filter 42 is formed on the liquid crystal layer 50 side of the glass substrate 41. The color filter 42 has color sections having respective colors of R (red), G (green), B (blue), etc. that are arrayed in a predetermined order. The counter electrode 43 is formed on the liquid crystal layer 50 side of the color filter 42. The alignment film 44 is formed on the liquid crystal layer 50 side of the counter electrode 43. Furthermore, a polarizing plate 45 is laid on a side of the glass substrate 41, the side being opposite from the liquid crystal layer 50 side.

Furthermore, in this embodiment, as illustrated in FIGS. 3 and 4, in a case where a foreign substance (luminance point defect occurrence portion) X that is a possible cause of a luminance point defect has been mixed in the liquid crystal layer 50, a means for blocking light toward the foreign substance X is provided. Specifically, a metal-halide containing region 60 is formed in a position in the glass substrate 31 of the substrate 30 and throughout the thickness direction of the glass substrate 31, the position covering a projection of the foreign substance X in a planar view. The metal-halide containing region 60 contains silver chloride and silver bromide.

In the metal-halide containing region 60, silver chloride and silver bromide are substantially uniformly dispersed in a state deposited into microcrystals of approximately 10 nm in diameter. Silver chloride and silver bromide in such a state exhibit photochromism in the illumination light.

That is, the metal-halide containing region 60, when not irradiated with light, shows translucency similar to a usual glass substrate (see FIG. 3). On the other hand, upon irradiation with light, the silver chloride and the silver bromide are photolyzed, and, accompanying this, silver atoms are generated. The silver atoms then form colloids, which blackens the metal-halide containing region 60 (see FIG. 4). Because the illumination light is blocked by this blackening, the emission light of the cold cathode tubes 17 does not reach the foreign substance X.

With the liquid crystal display device 10 of this embodiment, the metal-halide containing region 60 is formed in the position in the glass substrate 31, the metal-halide containing region 60 containing the metal halide which exhibits photochromism, the position being capable of blocking light toward the foreign substance (the luminance point defect occurrence portion) X that is a possible cause of the luminance point defect. This region is darkened upon supply of light from the cold cathode tubes 17. This blocks the illumination light from the cold cathode tubes 17, so that the illumination light does not reach the foreign substance X. Thus, higher display quality with the invisible luminance point defect can be realized.

Furthermore, in this embodiment, the metal-halide containing region 60 is formed throughout the thickness direction of the glass substrate 31.

Then, a portion remaining as the original glass substrate 31 having no metal-halide containing region 60 does not lie between the metal-halide containing region 60 and the foreign substance X. This can prevent the emission light from the cold cathode tubes 17 from diffracting while passing through the glass substrate 31 and reaching the foreign substance X. Thus, the higher display quality with the invisible luminance point defect can be realized.

Furthermore, in this embodiment, the silver chloride and the silver bromide is contained in the glass substrate 31, and this forms the metal-halide containing region 60.

Then, the silver chloride and the silver bromide contained in the glass substrate 31 are blackened upon exhibition of photochromism in the emission light from the cold cathode tubes 17. Therefore, light within a broader wavelength range can be blocked in the metal-halide containing region 60, and the luminance point defect can still more certainly be invisible.

Next, a method of manufacturing the liquid crystal display device 10 will be described.

Herein, manufacturing steps including a compensation step will mainly be described.

First, the glass substrate 31 is provided, and the TFTs 32 and the pixel electrodes 33 are formed on the glass substrate 31. Then, the alignment film 34 is formed on the TFTs 32 and the pixel electrodes 33. Thus, the substrate 30, which is the element substrate, is produced.

On the other hand, separately from the above-described glass substrate 31, the glass substrate 41 is provided, the color filter 42 is formed on the glass substrate, the counter electrode 43 is formed on the color filter 42, and, further, the alignment film 44 is formed on the counter electrode 43. Thus, the substrate 40, which is the opposite substrate, is produced.

The substrate 30 and the substrate 40 are laminated together with a predetermined space therebetween, and liquid crystal is sealed in the space. Thus, the liquid crystal layer 50 is formed. Furthermore, the polarizing plates 35, 45 are mounted on the respective faces of the two substrates 30, 40, the faces being opposite from the liquid crystal layer 50 side. Thus, the liquid crystal panel 11 is produced (see FIG. 3). Note that, in a below-described step of assembling the liquid crystal panel 11 and the backlight device 12, the substrate 30 (the glass substrate 31) out of the two substrates 30, 40 shall be disposed on the backlight device 12 side.

In the above-described manufacturing process, after the liquid crystal layer 50 is formed, lighting inspection for inspecting the presence and absence of display inferiority is performed (the liquid crystal panel during the manufacturing progress of this case will hereinafter be referred to as an inspection-object liquid crystal panel 11a).

Specifically, as illustrated in FIG. 5, first, a pair of polarizing plates 71 for inspection are arranged in a manner holding the substrates 30, 40 of the inspection-object liquid crystal panel 11a therebetween. Next, the backlight 72 for inspection is lighted, while the wiring formed on the glass substrate 31 is connected to a circuit for inspection, and a signal is supplied to the wiring as required so that the TFTs 32 are driven. Then, a display state, which is obtained by thus controlling the oriented state of the liquid crystal configuring the liquid crystal layer, is inspected by image process or visually by the inspector.

At this time, there is a case where the luminance point defect, which is viewed as a luminant point in spite that black is displayed, is detected. The cause of this luminance point defect can be that light strikes the foreign substance X that has entered the liquid crystal layer 50 and is diffusely reflected therefrom. When such a luminance point defect is detected, the luminance point defect is compensated in a luminance point defect compensation step, which will be described below. Note that a conceivable cause of entrance of the foreign substance X into the liquid crystal layer 50 is that the foreign substance X has been clinging on the face on the liquid crystal layer 50 side of the substrates 30, 40, that the foreign substance X has been mixed in the liquid crystal, etc. at a stage before the liquid crystal is injected.

The luminance point defect compensation step includes: a step of identifying the compensation position capable of blocking light toward the foreign substance X in the glass substrate 31; a step of doping the identified compensation position in the glass substrate 31 with halogen ions and metal ions; and irradiating the halogen ions and the metal ions in the doped compensation position with laser on the order of femtosecond or less so that crystals of metal halide which exhibits photochromism in the light supplied from the lighting device are deposited.

In the luminance point defect compensation step, the luminance point defect is compensated using a luminance point defect compensation device 70 illustrated in FIG. 6. The luminance point defect compensation device 70 is configured by a stage 73 (not illustrated in FIG. 5), a pair of polarizing plates 71 for inspection, a backlight 72 for inspection, and an XYZ drive part 74. The inspection-object liquid crystal panel 11a, which is the compensation object, is placed on the stage 73. The pair of polarizing plates 71 for inspection are disposed in a manner holding the stage 73 therebetween. The XYZ drive part 74 moves parallel to and perpendicular to the stage 73. The XYZ drive part 79 is provided with a CCD camera 75, an ion implantation part 76, and a laser irradiation part 77, which are disposed in a predetermined positional relation. The CCD camera 75 is for imaging the foreign substance X and the portion surrounding the foreign substance X. The ion implantation part 76 is for implanting the halogenating ion and the metal ion. The laser irradiation part 77 is for laser irradiation for the crystals of the metal halide to be deposited. Note that the stage 73 is made of glass to allow the light emitted from the backlight 72 for inspection to pass therethrough.

Using the luminance point defect compensation device 70, first, the compensation position capable of blocking light toward the foreign substance X in the glass substrate 31 is identified. First, the inspection-object liquid crystal panel 11a, which is the compensation object, is placed in a predetermined position on the stage 73 with the glass substrate 31 upside. Next, The backlight 72 is lighted, and the inspection-object liquid crystal panel 11a is caused to display black. In this state, the display state is imaged using the CCD camera 75 while the XYZ drive part 74 is being moved parallel to the stage 73, and the image result is image processed so that information on the position and the size of the foreign substance X is obtained. Then, based on this information, the position capable of blocking light toward the foreign substance X in the glass substrate 31 is identified.

Next, the identified position is doped with chloride ions, bromide ions, and silver ions. The doping with these ions shall be performed by an ion implantation method. Specifically, the XYZ drive part 74 is moved so that the ion implantation part 76 included therein is positioned right above the identified compensation position, and the ion doping are performed. In this embodiment, in this doping processing, the implanting conditions such as accelerating voltage is changed so that the doping is performed throughout the thickness direction of the glass substrate 31. Note that the ion-doped portion becomes a light-blocking layer in the end, which is a portion that is a possible black point in the display face. Therefore, the doping area in the direction of the face of the glass substrate 31 should be minimum. In this case, as a need arises, a means such as masking the surface of the glass substrate 31 (the top face of the inspection-object liquid crystal panel 11a in FIG. 6) etc. should be adopted to the portion not to be doped.

Next, the process shifts to a step of depositing the crystals of the metal halide in the portion that has been ion-doped as described above. In this step, the crystals of the metal halide are deposited by irradiating the glass substrate 31 with the femtosecond laser having a pulse width on the order from 10 to 13 seconds. Specifically, the XYZ drive part 74 is moved so that its laser irradiation part 77 is located right above the ion-doped portion, and laser irradiation is performed. Note that, in this embodiment, the laser irradiation is performed under following conditions: the wavelength of 780 nm, the pulse width of 100 fs, the repetition frequency of 1 (one) kHz, the pulse energy of 1 (one) mJ, and the output of 1 (one) W.

Once the portion doped with the kinds of ions is irradiated with the laser, the chloride or bromide ions and the silver ions which exist in the focus point are activated by ablation effect and are bound together, so that crystals of silver halide and crystals of silver bromide are deposited. By moving this focus point of the laser continuously in the glass substrate 31, the region where silver chloride and silver bromide have been deposited can be formed as a continuous region along the path of the focus point. Thus, in this embodiment, the metal-halide containing region 60 having the deposited crystals of silver chloride and silver bromide are formed throughout the thickness direction of the glass substrate 31.

In the metal-halide containing region 60 formed as described above, silver chloride and silver bromide are photolyzed upon irradiation with light, and the silver atoms, which are generated accompanying the photolyzation, form the colloids, and thus the metal-halide containing region 60 is blackened. Because this blackening blocks the illumination light, the light does not reach the foreign substance X (see FIG. 4).

After the liquid crystal panel 11 undergoes the above-described steps and the luminance point defect is compensated, a driver (not illustrated), which has been produced through other steps, and the backlight device 12 are mounted to the liquid crystal panel 11. Thus, the liquid crystal display device 10 is produced.

With the above-described method (including the compensation step) of manufacturing the liquid crystal display device 10 of this embodiment, the liquid crystal display device 10 is obtained, the liquid crystal display device 10 being sufficiently provided with the metal-halide containing region 60 in the position in the glass substrate 31, the metal-halide containing region 60 containing the crystals of the metal halide which is blackened upon supply of light from the backlight device 12 thereto, the position being capable of blocking light toward the foreign substance (the luminance point defect occurrence portion) X. With this liquid crystal device 10, the light supplied from the backlight device 12 is blocked by the blackened metal-halide containing region 60 and does not reach the foreign substance X. As a result of this, diffused reflection of light by the foreign substance X is not caused, so that the luminance point defect can be compensated so as to be invisible.

Furthermore, in this embodiment, by irradiating the halogen ions and the metal ions in the doped region with the femtosecond laser, the metal halide which exhibits photochromism is deposited so that the metal-halide containing region 60 is formed. In a case where the glass substrate is irradiated with the femtosecond laser, the energy is absorbed in the irradiated portion faster than the laser heat transfers to the portion surrounding the irradiation point. Therefore, the glass substrate surrounding the laser irradiation point is neither thermally nor chemically damaged. Thus, there is no concern for reducing the display quality of the liquid crystal display device 10.

Other Embodiments

While the embodiment in accordance with the present invention is described as above, the present invention is not limited to the embodiment described as above with reference to the drawings. For example, the following embodiments are also included within the scope of the present invention.

(1) In the above-described embodiment, the cold cathode tubes 17 are illustratively used as the light source. Instead of the light source, or in addition to the light source, a light source that emits light within a wavelength range on the order from 10 nm to 100 nm may be sufficiently provided. Metal halide, depending on its halogen ion species or metal ion species, has a characteristic wavelength range for exhibiting highly sensitive photochromism. Therefore, according to the used halogen ion species or metal ion species, a light source that emits light within the wavelength range for the ion species to exhibit photochromism may be selected. With this, the contained metal halide exhibits better photochromism, so that a higher light blocking effect can be produced.

(2) In the above-described embodiment, the metal-halide containing region 60 is formed in the position (an area) in the glass substrate 31, the position covering the projection of the foreign substance X in a planar view. Considering a viewing angle of the liquid crystal display device 10, a metal-halide containing region having an area that is also capable of certainly blocking oblique incident illumination light should be formed. Furthermore, the metal-halide containing region may be formed in a manner entirely covering (i.e. blocking light toward) the pixel related to the portion where the foreign substance X has been mixed.

(3) In the above-described embodiment, the metal-halide containing region 60 is formed throughout the thickness direction of the glass substrate 31. The thickness of the metal-halide containing region 60 is arbitrary. In this case, the position to form the metal-halide containing region 60 in the thickness direction of the glass substrate is arbitrary, e.g. the liquid crystal layer 50 side, the center in the thickness direction of the glass substrate, etc. Note however that, in order to certainly block the light, the metal-halide containing region 60 should be formed throughout the thickness direction.

(4) In the above-described embodiment, the crystals of silver chloride and the crystals of silver bromide are illustratively deposited as the metal halide. Also in a case where only one of silver chloride, silver bromide, and solid solution of silver chloride and silver bromide ($AgCl\alpha Br1-\alpha$) is deposited, sufficient light blocking effect can be expected.

(5) In the above-described embodiment, the metal-halide containing region 60 is formed by irradiation with the femtosecond laser having the pulse width of 100 fs. From a standpoint of reducing damage to the portion surrounding the irradiation point, the pulse width should be smaller; laser having a pulse width still smaller but within the permissive range of the compensation performance may be used.

(6) In the above-described embodiment, the wavelength of the laser emitted to form the metal-halide containing region 60 is 780 nm. It is only necessary for the wavelength of the laser to be a wavelength for the laser to be less likely to be absorbed when passing through the glass substrate 31; the wavelength should be from 750 nm to 850 nm. Furthermore, also the other conditions of irradiation may be modified depending on the composition of the irradiation-object glass substrate.

(7) In the above-described embodiment, the step of identifying the compensation position, the step of doping with kinds of ions, and the step of depositing the metal halide by irradiation with laser are performed using the luminance point defect compensation device 70. In order to avoid increase in complication of the device, separate devices may be provided to perform respective steps.

(8) In the above-described embodiment, the luminance point defect compensation device 70 has a configuration of the XYZ drive part 74 that includes the CCD camera 75, the ion implantation part 76, and the laser irradiation part 77 and moves parallel to and perpendicular to the stage 73. It may be configured such that the CCD camera, the ion implantation part, and the laser irradiation part are fixed while the stage moves parallel to and perpendicular to the CCD camera and the laser irradiation part.

(9) In the above-described embodiment, the luminance point defect is due to the foreign substance X that has entered the inside of the liquid crystal layer 50. The TFTs 32 and the pixel electrodes 33 etc. can cause misoperation due to a short circuit etc., and this can be the cause of the luminance point defect. The present invention is adoptable also to such a case.

(10) The present invention may be adopted to a liquid crystal display device that uses an switching element other than the TFTs 32.

The invention claimed is:

1. A liquid crystal display device including a liquid crystal and a lighting device, the liquid crystal panel having a liquid crystal layer provided between a pair of glass substrates, the lighting device supplying illumination light to the liquid crystal panel, the liquid crystal display device being characterized in that:
a metal-halide containing region is formed in a position in one of the pair of glass substrates, the metal-halide containing region containing a crystal of metal halide which exhibits photochromism in the light supplied from the lighting device, the position being capable of blocking light toward a luminance point defect occurrence portion that becomes a cause of a luminance point defect, and the one of the pair of glass substrates being disposed on the lighting device side.

2. The liquid crystal display device according to claim 1 characterized in that the metal halide includes at least one of silver chloride, silver bromide, and their solid solution.

3. The liquid crystal display device according to claim 1 characterized in that the metal-halide containing region is formed throughout a thickness direction of the glass substrate disposed on the lighting device side.

4. A method of manufacturing a liquid crystal display device including a liquid crystal and a lighting device, the liquid crystal panel having a liquid crystal layer provided between a pair of glass substrates, the lighting device supplying illumination light to the liquid crystal panel, the method being characterized by a luminance point defect compensation step for compensating a luminance point defect upon occurrence of the luminance point defect,
the luminance point defect compensation step including the steps of:
identifying a compensation position in one of the pair of glass substrates, the compensation position being capable of blocking light toward a luminance point defect occurrence portion that is a cause of the luminance point defect, the one of the pair of glass substrates being disposed on a lighting device side;
doping the identified compensation position in the glass substrate with a halogen ion and a metal ion; and
forming a metal-halide containing region, wherein the forming the metal-halide containing region includes irradiating the halogen ion and the metal ion in the doped compensation position with laser on the order of femtosecond or less so that a crystal of metal halide which exhibits photochromism in the light supplied from the lighting device is deposited.

5. The method of manufacturing the liquid crystal display device according to claim 4 characterized in that:
the halogen ion includes a chloride ion or a bromide ion at least; and
the metal ion includes a silver ion at least.

6. The method of manufacturing the liquid crystal display device according to claim 4 characterized in that:
doping with the halogen ion and the metal ion throughout the thickness direction of the glass substrate disposed on the lighting device side.

7. The liquid crystal display device according to claim 2 characterized in that the metal-halide containing region is formed throughout a thickness direction of the glass substrate disposed on the lighting device side.

8. The method of manufacturing the liquid crystal display device according to claim 5 characterized in that:
doping with the halogen ion and the metal ion throughout the thickness direction of the glass substrate disposed on the lighting device side.

* * * * *